United States Patent [19]

Dassler et al.

[11] Patent Number: 4,785,193
[45] Date of Patent: Nov. 15, 1988

[54] PROCESS AND APPARATUS FOR DETERMINATION OF DIMENSIONS OF AN ELONGATED TEST OBJECT

[75] Inventors: Hans-Ulrich Dassler, Oberschleissheim; Rudiger Haas, Faistenhaar; Gerhard Löffler, Munich, all of Fed. Rep. of Germany

[73] Assignee: OEM Messtechnik GmbH, Fed. Rep. of Germany

[21] Appl. No.: 874,335

[22] Filed: Jun. 13, 1986

[30] Foreign Application Priority Data

Jun. 13, 1985 [DE] Fed. Rep. of Germany ....... 3521260

[51] Int. Cl.$^4$ ............................................. G01B 11/08
[52] U.S. Cl. .................................... 250/560; 356/387
[58] Field of Search ...................... 250/560, 561, 222.1; 356/384–387, 381

[56] References Cited

U.S. PATENT DOCUMENTS

| | | | |
|---|---|---|---|
| 3,712,741 | 1/1973 | Revert | 356/387 |
| 3,749,500 | 7/1973 | Carlson et al. | 250/560 |
| 4,393,313 | 7/1983 | Calkins et al. | 250/560 |
| 4,393,401 | 7/1983 | Gorenflo et al. | 250/560 |
| 4,471,823 | 9/1984 | Wadell . | |
| 4,515,196 | 5/1985 | Shields | 144/378 |
| 4,559,452 | 12/1985 | Igaki et al. | 250/560 |

FOREIGN PATENT DOCUMENTS

| | | |
|---|---|---|
| 2469697 | 5/1981 | France . |
| 60-21408 | 2/1985 | Japan . |
| 396425 | 1/1966 | Switzerland . |

Primary Examiner—Edward P. Westin
Attorney, Agent, or Firm—Robert J. Koch

[57] ABSTRACT

An opto-electronic measuring bench for the automatic dimensional inspection of externally turned parts, where the test object is linearly illuminated and an image of two diametrically opposed contour points produced on two rows of photodiodes. The diameter of the shafts may be determined from the position of the images of the two contour points recognized as intensity jumps and the electrically determined distance of the two rows of diodes. The rows of diodes may be moved together with the light sources in the axial direction of the test object, in order to carry out diameter measurements over the entire axial length of the test object. The distance of the diode rows in the axial direction from a starting position is also determined electrically, so that length measurements of the test object are also possible.

6 Claims, 3 Drawing Sheets

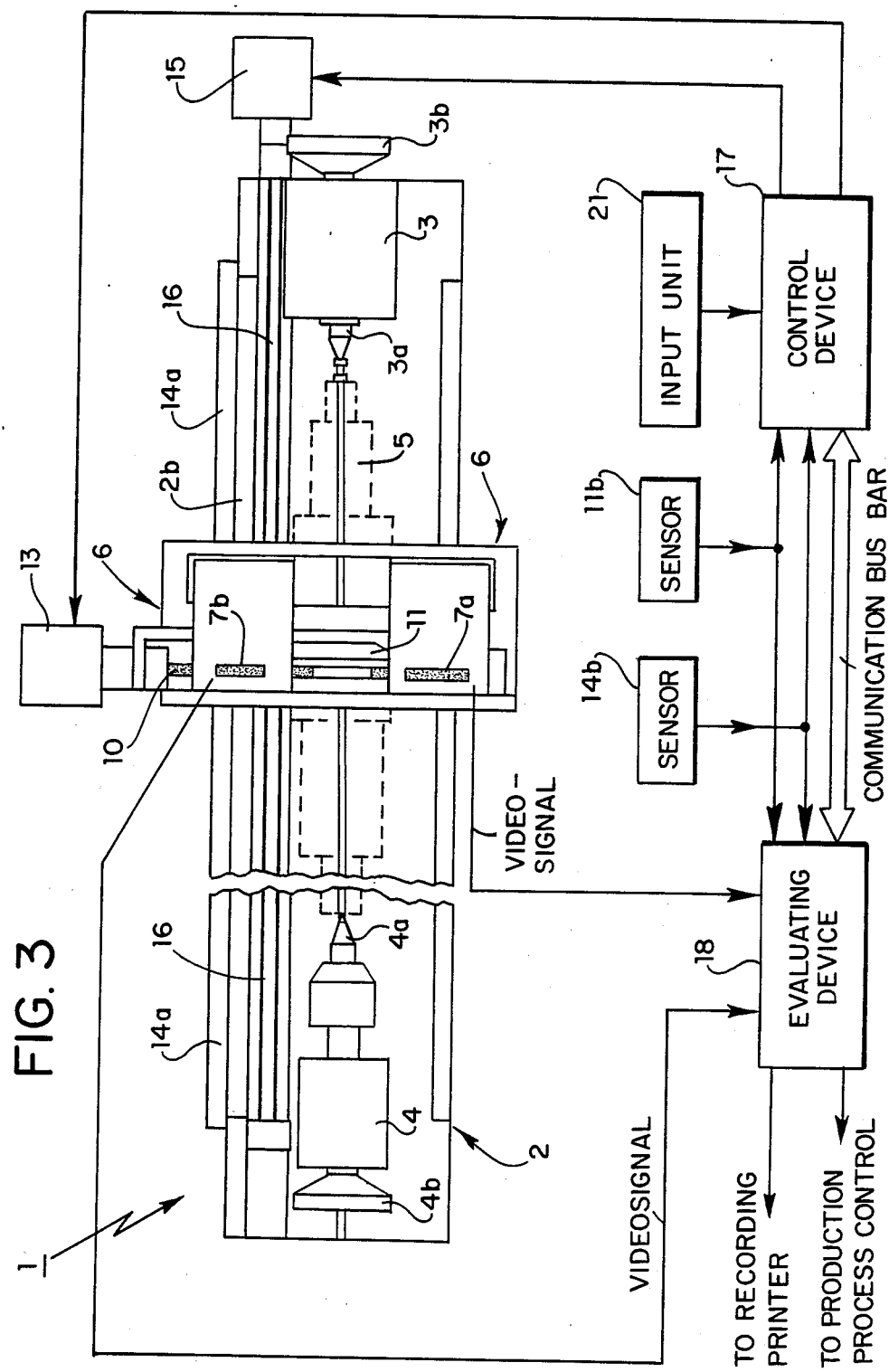

PROCESS AND APPARATUS FOR DETERMINATION OF DIMENSIONS OF AN ELONGATED TEST OBJECT

BACKGROUND OF THE INVENTION

1. Field of the Invention

The invention relates to a process and apparatus for determination of the dimensions of an elongated test object, more particularly the diameter of shafts.

2. Description of the Related Art

In the manufacture and processing of externally turned parts, in particular shafts, tests objects are taken from the continuous production flow for dimensional inspection and tested manually by measuring gauges (micrometers or the like) for dimensional accuracy and roundness. In the case of longer test objects, several locations along the rotating axis of the test object are tested.

Such manual measuring inspections are cumbersome, time consuming and error-prone. Furthermore, measured tolerance excesses must be entered manually into the production process control means so that on the whole the known dimension control method operates with a significant time delay between the occurrence and the elimination of unacceptable dimensional deviations, resulting in a correspondingly high production of rejects.

SUMMARY OF THE INVENTION

It is an object of the invention to provide a process and an apparatus for determination of the dimensions of elongated test objects. According to the invention provisions are provided for clamping and release of the test object and performance of automatic dimensional inspection, thereby allowing rapid and precise verification and a significant reduction in the production of rejects. Two diametrically opposed contour points of the test object are individually illuminated by a line shaped light source and reproduced on an associated photodiode line. The position of the intensity variation of a linear image on each of the photodiode lines and the distance of the two photodiode lines are determined continuously in the form of electrical values and the distance between the two contour points determined therefrom.

The apparatus may include an adjustable clamping bench (2, 3, 3a, 3b, 4, 4a, 4b) for the axially centered clamping of the test object (5) on its axial frontal sides, a measuring carriage (6) displaceable in an axially parallel manner in relation to a clamped-in test object (5), surrounding the test object (5) and carrying two line shaped illumination sources mounted under the test object (5) in a radial plane of it, with each of said sources (8a, 8b) illuminating one of the diametrically opposed contour points (5a, 5b) of the test object (5). Two lines of photodiodes (7a, 7b) are mounted on the measuring carriages (6) above the test object (5) in the beam path (measuring plane 9) of the light sources (8a, 8b). The photodiodes are displaceable in the radial plane under consideration of the test object (5). A glass measuring rod (11) is mounted parallel to the rows of photodiodes (7a, 7b) for the determination of the distance between the two lines of photodiodes (7a, 7b) an electrical evaluating device (17) to determine the distance between the two illuminated contour points (5a, 5b) of the test object (5) from the video signals of the two rows of photodiodes (7a, 7b) and the measuring signals of the glass measuring rod (11).

Additional objects will be more apparent from the embodiment described below with reference to the drawings.

BRIEF DESCRIPTION OF THE DRAWINGS

In the drawings:

FIG. 3 shows a top elevation of the measuring apparatus according to FIG. 1 with a schematic block circuit diagram of the control and evaluating devices.

DETAILED DESCRIPTION OF THE PREFERRED EMBODIMENT

Figure 1:
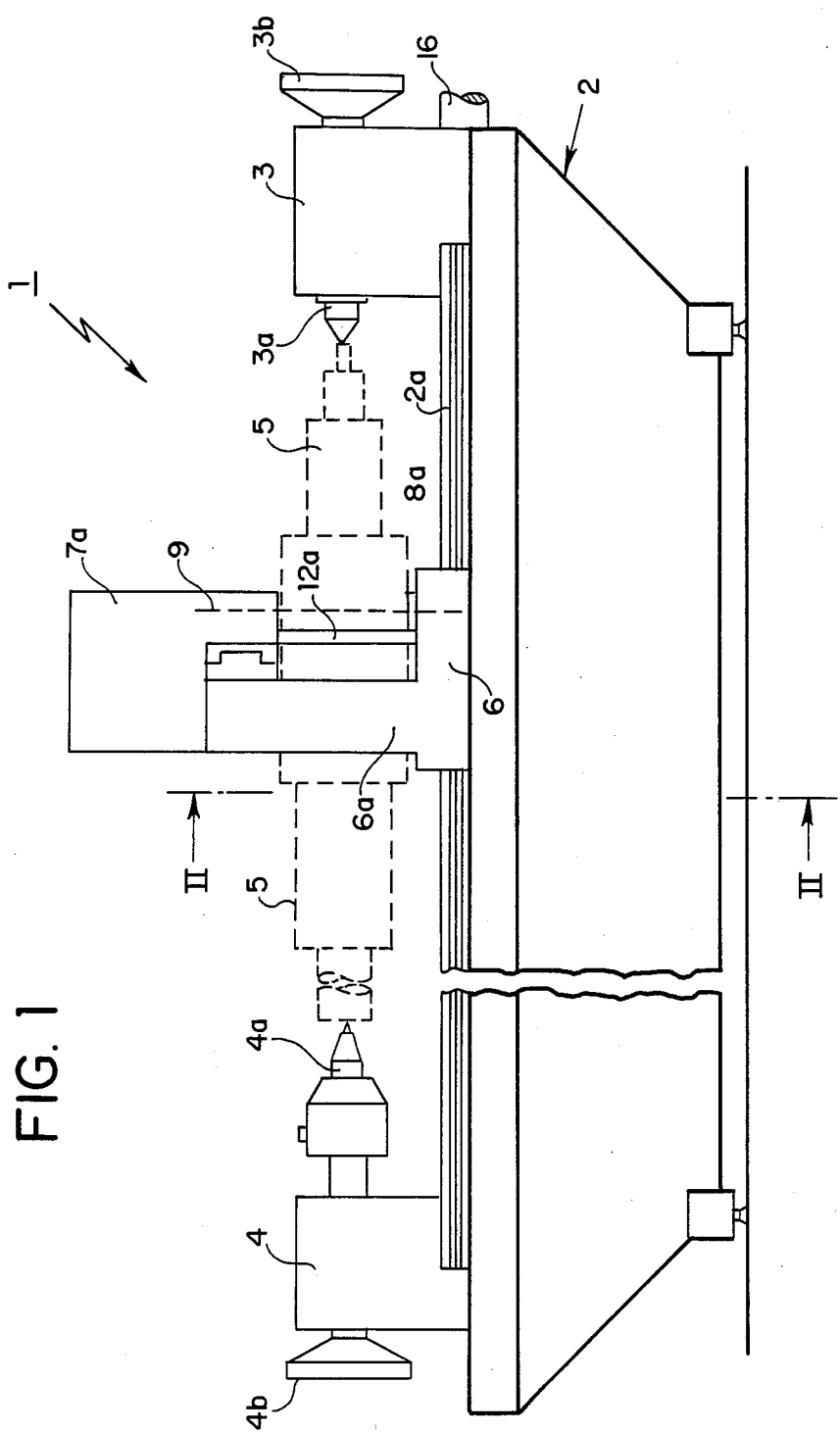
FIG. 1 shows a lateral elevation of a measuring apparatus according to the invention.

The measuring apparatus 1 shown in FIG. 1 includes a measuring table 2 standing on the floor and made of a massive cast iron plate. A spindle head 3 and a tailstock 4 are mounted on the measuring table 2 and a test object 5, indicated by a broken line, may be clamped between them. Both of the stocks 3, 4 comprise a spindle 3a and 4a respectively, said spindles being rotatable by means of a manual wheel 3b and 4b. The points of the spindles contact the axial frontal sides of the test object 5 in an axially centered manner in the illustrated example of a shaft with radially different segments.

The measuring table 2 includes the guide rails 2a and 2b (not shown in FIG. 1) extending over nearly its entire length, with a measuring carriage 6 being displaceable within the entire range between the stocks 3, 4. As seen in detail in FIG. 3, this displacement of the measuring carriage 6 is effected by a ballscrew 16 arranged parallel to the test object 5 and driven in a stepping manner and continuously by an electric drive motor 15.

Figure 2:
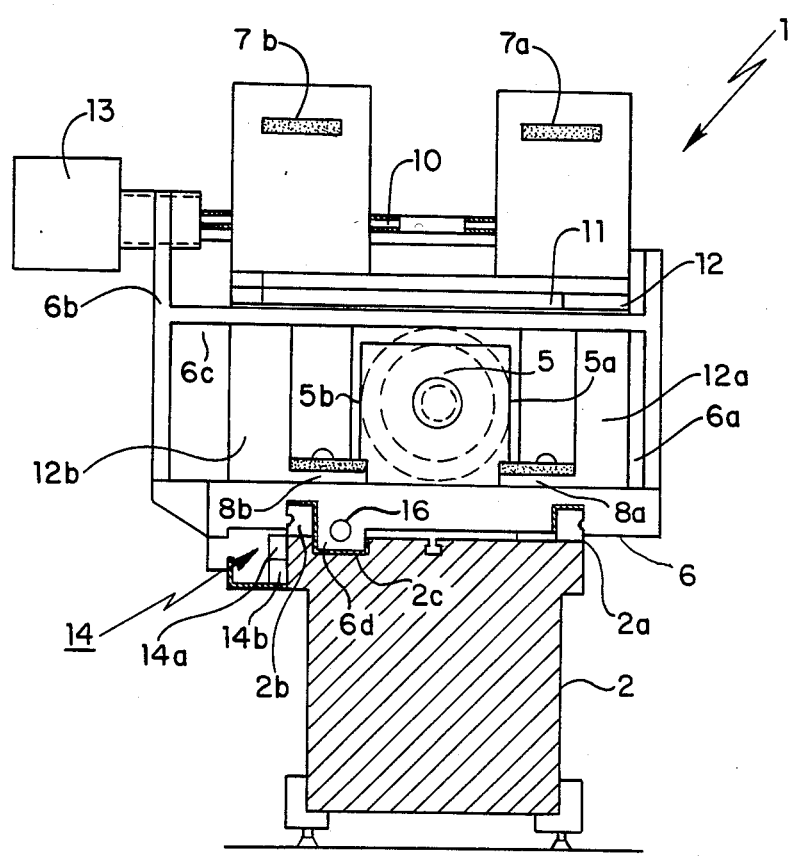
FIG. 2 shows a cross section through the measuring apparatus of FIG. 1 along line II—II in FIG. 1.

The measuring carriage 6 exhibits, as seen in FIG. 2, a lower support plate to which a support frame with lateral struts 6a, 6b and a transverse strut 6c are fastened. Two longitudinal grooves are molded into the bottom side of the support plate for the guide rails 2a, 2b together with a longitudinal guide piece 6d, which engages an appropriate guide groove 2c of the measuring table 2. The spindle 16 passes through the longitudinal guide piece 6d which comprises a threaded bore aligned with the spindle 16.

The measuring carriage 6 completely surrounds the test object 5, as shown in FIG. 2. The transverse strut 6c is located above the test object 5. The transverse strut 6c carries two rows of photodiodes 7a, 7b, which are displaceable in transverse guides 12 along a common axis relative to each other. The axis of the motion of the rows of photodiodes 7a, 7b is perpendicular to the longitudinal axis of the test object 5, i.e. it is located in the measuring plane 9 (FIG. 1), which coincides with a radial plane of the test object 5.

The motion of the rows of photodiodes 7a, 7b proceeds symmetrically to the longitudinal axis of the test object 5 and serves to set the rows of photodiodes 7a, 7b to different diameters of the test object 5.

Each row of photodiodes is built into a camera with appropriate optical means, of which an explanation at this point is unnecessary. Each camera housing comprises an L-shaped extension bracket 12a and 12b, the horizontal leg whereof carries a line shaped illumination source 8a and 8b. Each light source 8a, 8b extends axially parallel to the axis of motion of both rows of photodiodes 7a, 7b and is aligned so that its radiation is directed into the optical means of the associated photodiode camera. In the course of the motion of the rows of photodiodes 7a, 7b the light sources 8a, 8b are thus displaced simultaneously and in the same manner.

The rows of photodiodes 7a, 7b and the light sources 8a, 8b are positioned in relation to the test piece 5 so that two diametrically opposed contour points 5a, 5b are reproduced on the rows of photodiodes 7a, 7b. These images are line shaped corresponding to the linear configuration of the light sources 8a, 8b. A jump in intensity is present at the location of the image of an associated contour point 5a, 5b. This intensity jump is readily displayed relative to a reference point in the camera housing by means of the grid of a row of photodiodes in its X-Y coordinates. This signifies that the positioning of the rows of photodiodes 7a, 7b must merely assure that on each row of photodiodes the intensity jump generated by the contour point 5a, 5b involved is reproduced, with the position of said intensity jump being evaluated by the video signal of each row of photodiodes 7a, 7b. By rotating the test object 5, pairs of contour points may be reproduced along the entire circumference of the test object 5 successively on the rows of photodiodes 7a, 7b.

The distance between each of the pairs of contour points illuminated, i.e., the diameter of the test object 5, is obtained from the position of the intensity jumps on the rows of photodiodes 7a, 7b relative to the reference point of each photodiode row camera and the distance between the two reference points of the photodiode cameras. A glass measuring rod 11 is mounted axially parallel to the axis of motion of the two photodiode rows 7a, 7b on the diode row 7b in order to determine this distance, which varies as a function of the positioning of the rows of photodiodes 7a, 7b on test objects 5 having different diameters. The glass measuring rod 11 is a linear incremental emitter consisting of a glass rail with bright-dark markings scanned by a sensor in the form of a light barrier, optoelectronically. In the case of the glass measuring rod 11 a sensor 11b (FIG. 3, part of block diagram) is fastened to the diode row 7a. The markings may be optically coded so that the signal sensed by sensor 11b is decoded in order to obtain the desired measurement. Alternatively, the sensor may embody a pulse counter which detects the number of markings traversed by the sensor when moved from an initial to a final position.

To move the rows of photodiodes 7a, 7b relative to the measuring carriage 6, a spindle 10 passes through corresponding threaded bores of the camera housing of the diode rows 7a, 7b. The spindle 10 is driven by an electric drive motor 13, which, together with the spindle 10, is bearingly supported on the outer segment of the lateral strut 6b. By these means, the rows of photodiodes 7a, 7b may be set with the aid of the drive motor 15 onto any radial plane of the test object 5 and by means of the drive motor 13 (within a wide range of diameters) onto any diameter of the test object 5. The diameters and the roundness of test objects may therefore be determined over the entire length of the test object 5 in a plurality of measuring points (from several measurements in the same radial plane).

In order to obtain information concerning the position of the photodiode rows 7a, 7b in the course of their movement along the test object 5, a glass measuring rod 14 is mounted on the measuring table (FIG. 3). The glass rail 14a is located on the measuring table 2, while the sensor 14b (FIG. 2) of the glass measuring rod 14 is on the measuring carriage 6. The origin of the glass measuring rod 14 is the starting position of the measuring carriage 6. The length of the test object may thereby be determined.

A control device 18 to control the drive motors 13, 15 is shown schematically in FIG. 3 and its control command outlets are connected to the control inlets of the motors 13, 15. The control device 18 receives information concerning the instantaneous position of the measuring carriage 6 and the photodiode rows 7a, 7b from the sensors 11b, 14b of 11 and 14. The control device 18 may be programmed in any manner desired by means of an input unit 21, in particular in relation to the number of measuring processes to be performed.

The evaluation of the individual measurements is carried out by means of an evaluating device 17, indicated schematically only and receiving the video signals of the photodiode rows 7a, 7b, together with the measuring signals of the glass measuring rods 11 and 14. The evaluating device determines for every setting of the measuring carriage, i.e. for each individual measuring plane 9, the distance of each pair of contour points, the average diameter and the roundness of the test object. The data may be printed by a recording printer, not shown. In the example shown, the evaluating device passes its measured results to a production control unit, not shown, so that any tolerance deviation may be taken into account practically without delay in production. The evaluating device 17 communicates with the control device 18 in order to appropriately take into account the measuring programs in the evaluation. These measuring programs may also contain data concerning the nominal dimensions of individual types of test objects, which then are compared with the relevant measured results for the determination of tolerance deviations.

The measuring carriage is returned to behind the point of the spindle 4a, for insertion and removal of the test objects to insure the ready insertion of the test object 5.

In a completed measuring apparatus 1 the resolution obtained amounted to 1 μm for diameter determinations and 0.002 mm for lengths. On the apparatus, metal shafts in a diameter range of 7 to 100 mm with a length of 200 to 700 mm, may be measured. It should be understood that the invention is not restricted to this specific described embodiment.

We claim:

1. A method for determining dimensions of a shaft-like test object comprising the steps of:
    (1) individually illuminating diametrically opposed contour points of a test object by line-shaped light sources;
    (2) reproducing said contour points by detecting an intensity variation in a projected linear image of said test object on lines of photodiodes associated with each of said line-shaped light sources;
    (3) continuously determining a distance between said lines of photodiodes in the form of electrical signals; and
    (4) utilizing the electrical signals and said detected intensity variations in order to calculate the distance between said contour points.

2. A method as in claim 1 further comprising the steps of:

stepwise displacement of said light sources and photodiodes along an axis of said test object; and determining the distance between each respective pair of contour points in accordance with steps 1–4.

3. An apparatus for determining dimensions of a shaft-like test object comprising:

an adjustable clamping bench including means for centered clamping said test object in axial alignment with said bench;

a measuring carriage mounted on said bench in an axially displaceable fashion;

means for illuminating diametrically opposed contour points of said test object, aligned in a radial plane of said test object, carried on said test carriage wherein said means for illuminating are two line-shaped light sources;

two lines of photodiodes mounted on said measuring carriage associated with respective line-shaped light sources and aligned in a beam path of said light sources opposing said contour points, said lines of photodiodes being displaceably mounted along a common axis perpendicular to said test object axial alignment;

optical measuring means for determining distance between said displaceable lines of photodiodes mounted parallel to said lines of photodiodes; and evaluating means for determining distance between said contour points, responsive to said optical measuring means and signals generated by said lines of photodiodes;

a second optical measuring means mounted on said bench in an axially parallel manner for determining distance of displacement of said measuring carriage from an initial starting position.

4. An apparatus according to claim 3, further comprising motor-driven spindle means for displacing said measuring carriage parallel to said axis.

5. An apparatus according to claim 3, further comprising a transverse guide means for carrying said photodiodes mounted on said measuring carriage; and motor-driven spindle means for displacing said lines of photodiodes in a direction transverse to said axis, associated with said transverse guide means.

6. An apparatus according to claim 5, further comprising motor-driven spindle means for displacing said measuring carriage parallel to said axis.

* * * * *